(12) United States Patent
Shin

(10) Patent No.: US 7,636,590 B2
(45) Date of Patent: Dec. 22, 2009

(54) SELF-CRADLING TYPE PORTABLE COMMUNICATION TERMINAL

(75) Inventor: Heung-Sik Shin, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 501 days.

(21) Appl. No.: 11/656,277

(22) Filed: Jan. 22, 2007

(65) Prior Publication Data

US 2007/0191077 A1 Aug. 16, 2007

(30) Foreign Application Priority Data

Jan. 20, 2006 (KR) .................. 10-2006-0006508

(51) Int. Cl.
*H04M 1/00* (2006.01)
(52) U.S. Cl. .................. 455/575.1; 455/90; 455/575.4; 348/10.04
(58) Field of Classification Search ........... 455/550.1, 455/343.5, 343.6, 556.2, 575.1, 575.3, 575.4, 455/90.3
See application file for complete search history.

(56) References Cited

U.S. PATENT DOCUMENTS 6,141,540 A * 10/2000 Richards et al. .......... 455/575.3
6,657,654 B2 * 12/2003 Narayanaswami ....... 348/14.04
7,480,524 B2 * 1/2009 Moon et al. ............. 455/575.4
2007/0254729 A1 * 11/2007 Freund .................... 455/575.3

FOREIGN PATENT DOCUMENTS

KR 20-0314234 5/2003
KR 1020050091631 9/2005

* cited by examiner

*Primary Examiner*—Nick Corsaro
*Assistant Examiner*—Sarwat Chughtai
(74) *Attorney, Agent, or Firm*—The Farrell Law Firm, LLP

(57) ABSTRACT

The portable communication terminal includes a body, a folder, a first hinge unit mounted on an upper surface of the body to rotatably connect the folder to the body, for providing a semi-automatic opening and closing force, a rotatable socket mounted on a bottom surface of the body, having a second hinge axis to be parallel with a first hinge axis, and rotatably connected to the body by a second hinge unit adjacent to the first hinge unit, and a power supply unit detachably attached to the rotatable socket in parallel, and rotating in a direction toward or away from the body while facing the bottom surface of the body, so that a free end of the power supply unit contacts the ground to slantingly support the body.

10 Claims, 14 Drawing Sheets

SELF-CRADLING TYPE PORTABLE COMMUNICATION TERMINAL

PRIORITY

This application claims priority to an application entitled "Self-Cradling Type Portable Communication Terminal" filed with the Korean Intellectual Property Office on Jan. 20, 2006 and assigned Serial No. 2006-6508, the contents of which are incorporated herein by reference.

BACKGROUND OF THE INVENTION

1. Field of the Invention

The present invention relates to a portable communication terminal including cellular phones, Personal Digital Assistants (PDAs), Hand-Held Phones (HHPs), game phones, camera phones, and the like, and more particularly to a self-cradling type portable communication terminal having a self-cradling function.

2. Description of the Related Art

In general, a "portable communication terminal" refers to an electronic device which a user can carry while wirelessly communicating with another user. In consideration of portability, design of such a portable communication terminal has tended not only toward compactness, slimness and lightness, but also toward providing multimedia capabilities to enable the user to pursue a wider variety of functions. In particular, future portable communication terminals will be not only used for many functions while still being compact and light, but also be modified to be suitable for functioning in a multimedia environment and for providing internet access and functions. Additionally, such portable communication terminals may be used by men and women, young and old, anywhere in the world, and are recognized as a necessity which the user always carries.

Conventional portable communication terminals are classified into various types depending on their appearance such as bar-type portable communication terminals, flip-type portable communication terminals, and folder-type portable communication terminals. Further, portable communication terminals are classified as neck wearable type terminals and wrist wearable type terminals depending on the position at or the way in which the user wears the terminal. Additionally, portable communication terminals are classified as rotation-type terminals and sliding-type terminals depending on the methods of opening and closing the terminals.

Further, each of the conventional portable terminals has been converted to enable a voice communication as well as a high-speed data communication. As consumer demands have increased, various services have been provided using wireless communication technology for transmitting and receiving data at a high speed.

With respect to the portable communication terminals as described above, the user has cradled the portable communication terminal using a purchased separate cradle, or cradled the portable communication terminal using a purchased separate charger while charging the terminal. In addition, the user has slantingly cradled the portable communication terminal on the purchased separate cradle, and comfortably viewed various images or moving pictures displayed on a displaying unit of the terminal.

However, it is not economical to purchase a separate cradle in order to cradle the portable communication terminal. Further, there is a disadvantage in that the charger must be carried with the user when the portable communication terminal is cradled and charged by using a provided separate charger.

For example, if the user does not carry the charger because it is inconvenient to carry the charger, it is difficult to charge and cradle the portable communication terminal, causing inconvenience to the user.

SUMMARY OF THE INVENTION

Accordingly, the present invention has been made to solve the above-mentioned problems occurring in the prior art, and it is an object of the present invention to provide a portable communication terminal which has a self-cradling function so that a user need not purchase a separate cradle, thereby having an economic benefit.

It is another object of the present invention to provide a portable communication terminal, which provides a power supply device with a cradling function so that it is convenient to use the portable communication terminal rapidly and easily anywhere.

It is still another object of the present invention to provide a portable communication terminal, in which a power supply unit is detachably attached to a rotatable socket, rotatably connected to a body of the portable communication terminal for cradling the body by itself to provide a stable cradle by its weight.

It is still another object of the present invention to provide a portable communication terminal which maintains a stable and easy cradling operation and a stable cradle state after cradling the portable communication terminal by a power supply unit.

It is still another object of the present invention to provide a portable communication terminal, which enables a user to conveniently view moving pictures in a multimedia circumstance.

It is still another object of the present invention to provide a portable communication terminal, which can be rapidly and freely cradled anywhere according to a user's intention.

In order to accomplish these objects, a self-cradling type portable communication terminal includes a body, a folder, a first hinge unit mounted on an upper surface of the body to rotatably connect the folder to the body for providing opening and closing force semi-automatically, a rotatable socket mounted on a bottom surface of the body having a second hinge axis to be parallel with a first hinge axis, and rotatably connected to the body by means of a second hinge unit adjacent to the first hinge unit, and a power supply unit detachably attached to the rotatable socket in parallel and rotating in a direction toward or away from the body while facing the bottom surface of the body, so that a free end of the power supply unit contacts the ground to slantingly support the body.

In order to accomplish these objects of the present invention, a portable communication terminal includes a body, a folder, a first hinge unit mounted on an upper surface of the body to rotatably connect the folder to the body, for providing opening and closing force semi-automatically, a rotatable socket mounted on a bottom surface of the body, having a second hinge axis to be parallel with a first hinge axis and rotatably connected to the body by a second hinge unit to be remote from the first hinge unit, and a power supply unit detachably attached to the rotatable socket in parallel and rotating in a direction toward or away from the body while facing the bottom surface of the body, so that a free end of the power supply unit contacts the ground to slantingly support the body.

BRIEF DESCRIPTION OF THE DRAWINGS

The above and other objects, features, and advantages of the present invention will be more apparent from the following detailed description taken in conjunction with the accompanying drawings, in which.

DETAILED DESCRIPTION OF EXEMPLARY EMBODIMENTS

Hereinafter, preferred embodiments of the present invention will be described with reference to the accompanying drawings. In the following description of the present invention, a detailed description of known functions and configurations incorporated herein is omitted to avoid making the subject matter of the present invention unclear.

Figure 1:
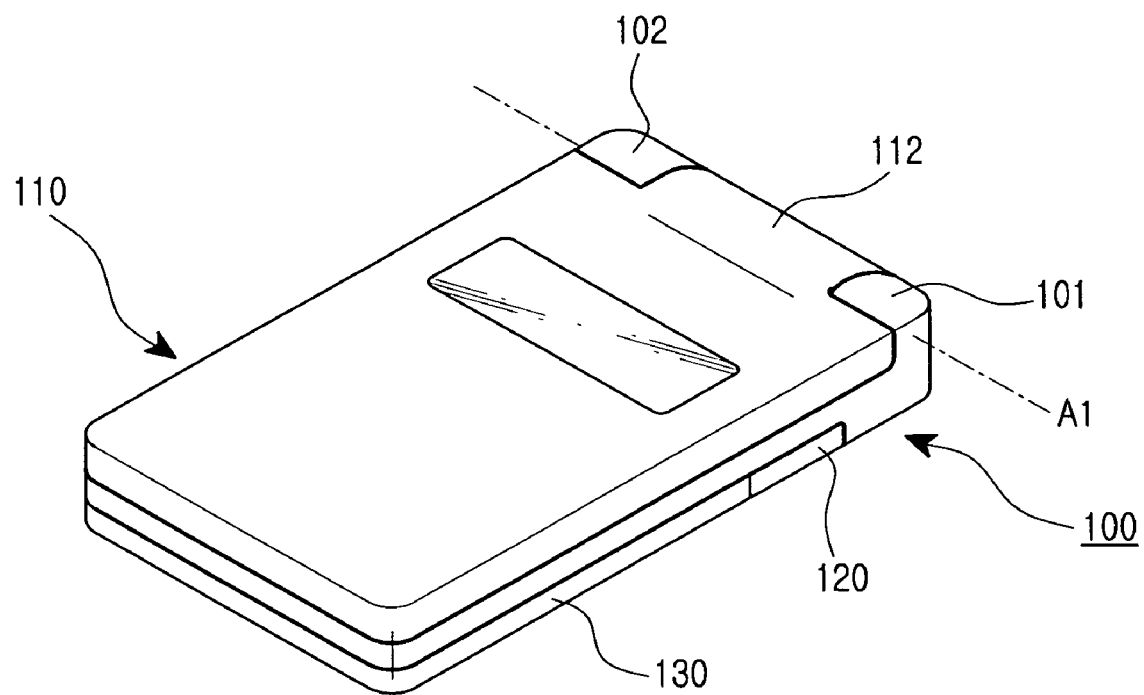
FIG. 1 is a perspective view illustrating a portable communication terminal according to the present invention, in which an upper folder is shown.
Figure 2:
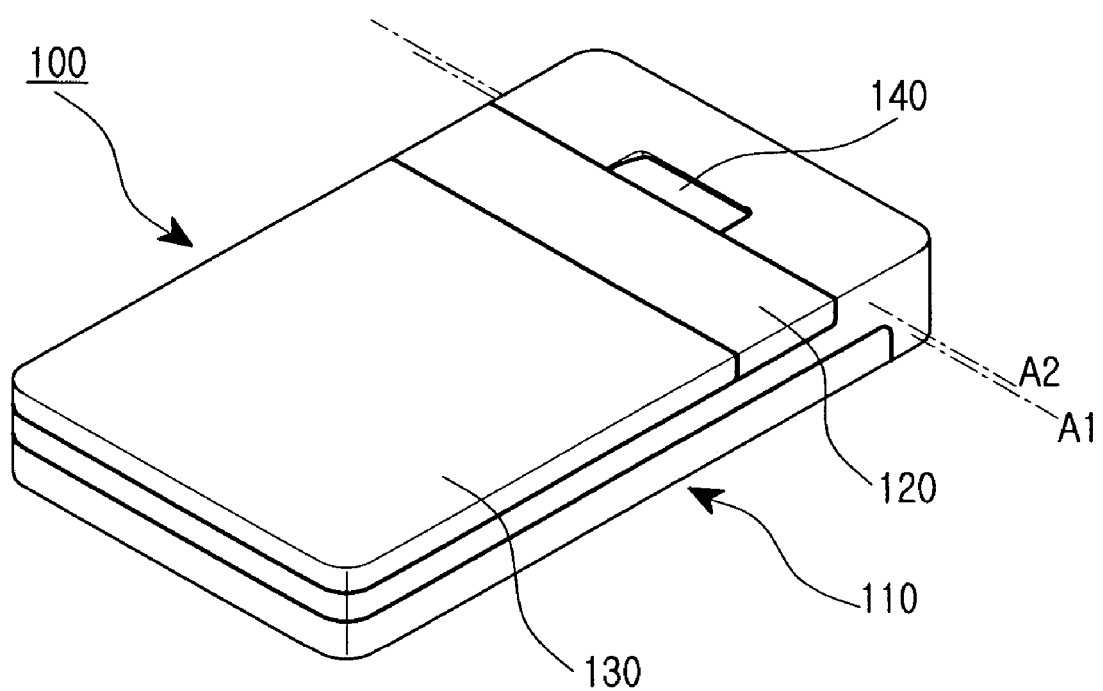
FIG. 2 is a perspective view illustrating the portable communication terminal of FIG. 1, in which a lower folder is shown.

As illustrated in FIGS. 1 and 2, the folder type portable communication terminal includes a body 100, a folder 110, and a first hinge unit for rotatably connecting the folder 110 to the body 100 to semi-automatically open and close the folder 110. The first hinge unit includes a hinge module (not shown) and a hinge dummy (not shown), which provides a first hinge axis A1. A pair of side hinge arms 101, 102 are formed at a side of the body 100, and a center hinge arm 112 is formed at a side of the folder 110 and engaged with the pair of side hinge arms 101 and 102. The center hinge arm 112 is assembled with the side hinge arms 101 and 102 along the first hinge axis A1 by the hinge module. The folder 110 is rotatively connected to the body 100 by the hinge module and the hinge dummy.

Figure 3:
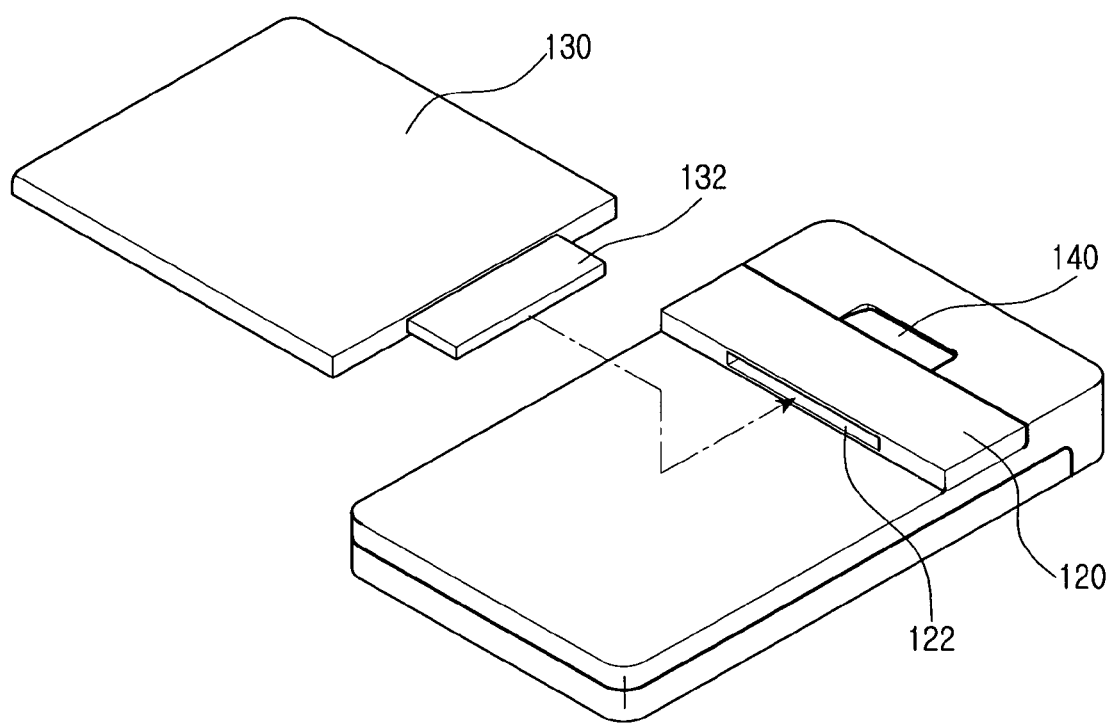
FIG. 3 is a perspective view illustrating the portable communication terminal of FIG. 2, in which a power source is disassembled.

As illustrated in FIGS. 2 and 3, the portable communication terminal according to the present invention is provided with a self-cradling device to enable the body 100 to be slantingly cradled by itself, and includes a rotatable socket 120 mounted on a bottom surface of the body 100. A power supply unit 130 is integrated with the rotatable socket 120. The rotatable socket 120 rotates by a second hinge unit 140 being adjacent to the first hinge unit in a direction toward or away from the body 100, while facing the bottom surface of the body 100. A second hinge axis A2 provided to the second hinge unit 140 is parallel with the first hinge axis A1, and the first and second hinge units are adjacent to each other to extend in parallel. In addition, the first hinge unit is disposed on an upper surface of the body 100, and the second hinge unit is arranged on the bottom surface of the body 100.

Figure 4:
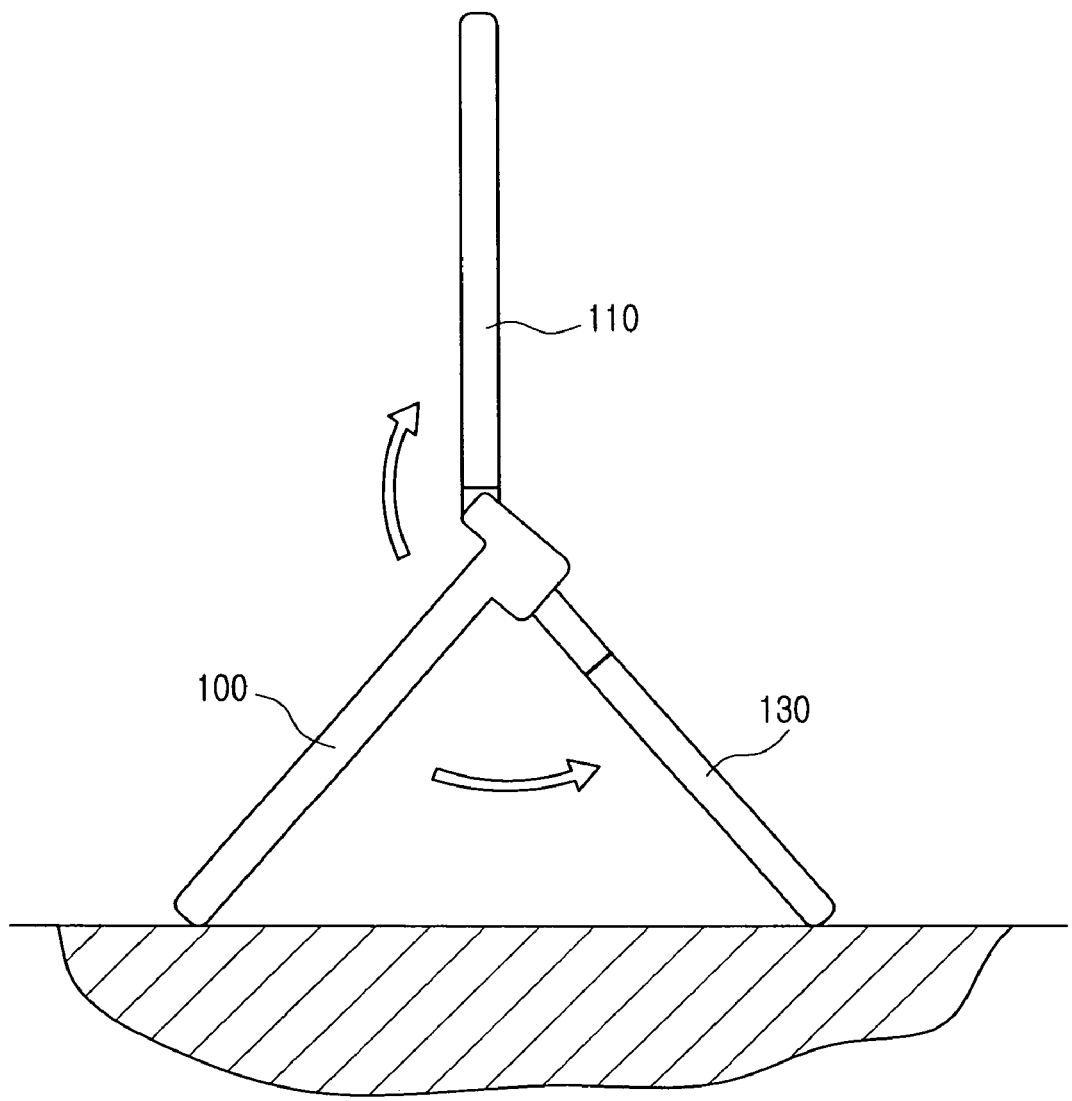
FIG. 4 is a side view illustrating the portable communication terminal of FIG. 1, in which the portable communication terminal is cradled.

The power supply unit 130 is preferably made up of a battery pack including a plurality of battery cells (not shown), and is detachably attached to the rotatable socket 120 in a parallel direction. Further, the power supply unit 130 rotates in a direction toward or away from the body 100 while facing the bottom surface of the body 100, and is integrated with the rotatable socket 120 so as to move along with the rotatable socket 120. When the power supply unit 130 rotates, a free end of the power supply unit 130 contacts the ground to enable the body 100 to be inclined. The inclined body 100 is illustrated in FIG. 4. A plurality of keys are arranged on the upper surface of the body 100 to input data, while a data output unit such as a liquid crystal display unit, or a data input/output unit such as a touch screen is disposed on the bottom surface of the folder 110.

As illustrated in FIG. 3, the power supply unit 130 is provide with a connection member 132, and the rotatable socket 120 has a first slot 122 formed, through which the connection member 132 is inserted into the rotatable socket 120 in parallel. The connection member 132 is made up of a connector, preferably plural connectors, including a plurality of exposed terminals.

The connection member 132 is inserted into the first slot 122 and electrically connected to the rotatable socket 120. The connection member 132 is mechanically held. Thus, the connection member 132 has double functions such as electrical connection and mechanical holding.

Figure 14:
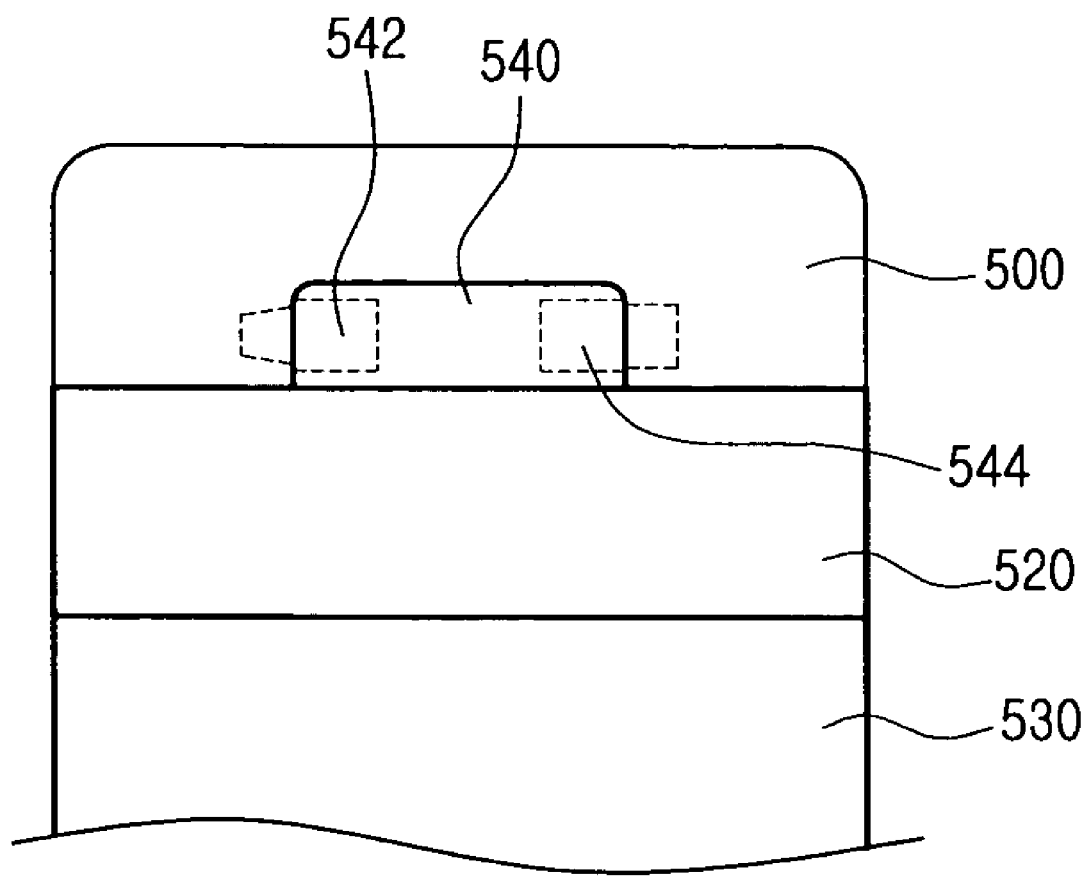
FIG. 14 is a front view illustrating rotation sockets according to the present invention, in which the rotation sockets are assembled with the portable communication terminal.

The structure of the second hinge unit 140 will be described with reference to FIG. 14. As illustrated in FIG. 14, the hinge unit 540 has an identical structure with that of the second hinge unit 140. The hinge unit 540 includes a hinge module 542 received in a hinge housing, and a hinge dummy 544 arranged to be corresponding to the hinge module 542. The hinge module 542 is provided to semi-automatically open and close the folder 110, and includes a hinge shaft, a hinge cam, and a hinge spring (not shown). The hinge module 542 provides the rotatable socket 520 with force to stop the rotation of the socket 520, so that the power supply unit 130 slantingly supports the body 100.

The hinge dummy 544 functions as a hinge shaft, through which a flexible circuit (not shown) passes. The flexible circuit electrically connects the power supply unit 530 to the body 100. The hinge module 542 and the hinge dummy 544 are coaxial with each other and mounted to face each other to provide the second hinge axis A2 of the rotatable socket 520.

Figure 5:
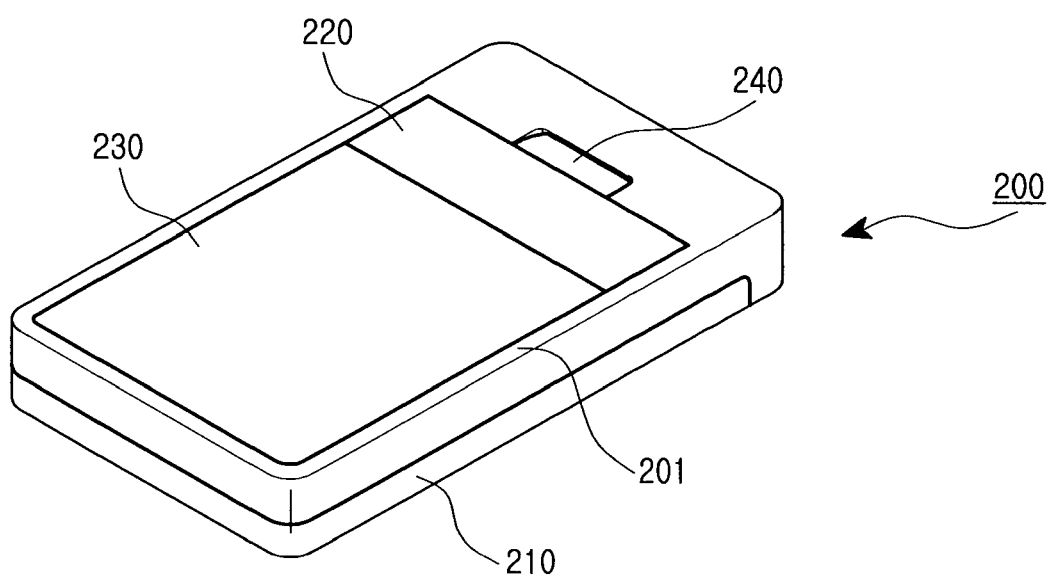
FIG. 5 is a perspective view illustrating a portable communication terminal according to another embodiment of the present invention, in which a lower folder is shown.
Figure 6:
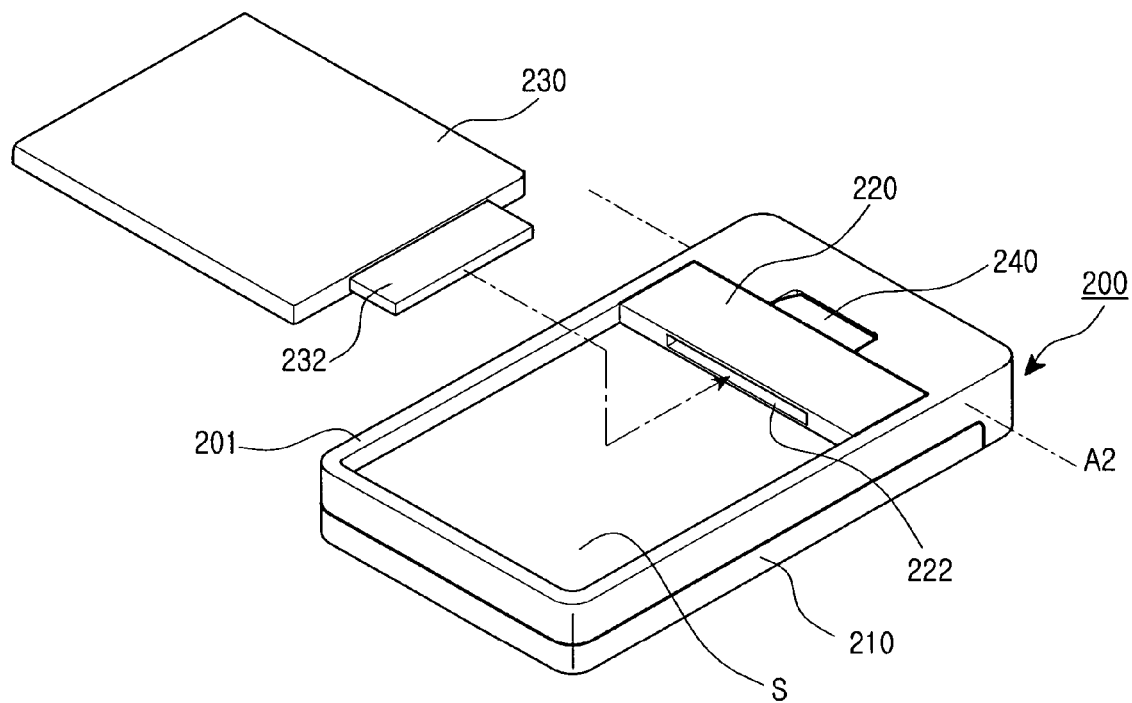
FIG. 6 is a perspective view illustrating the portable communication terminal of FIG. 5, in which a power source is disassembled.
Figure 7:
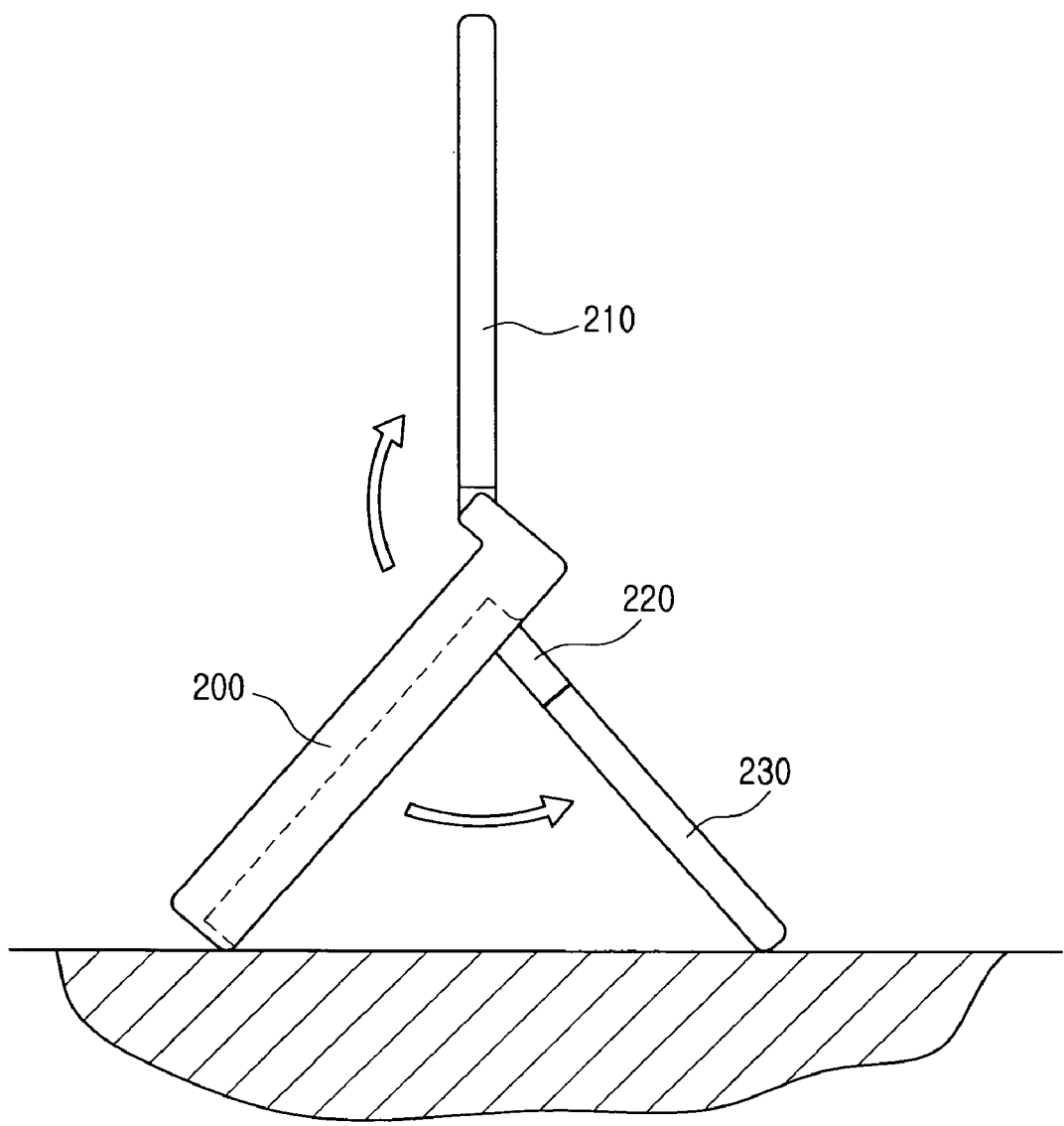
FIG. 7 is a side view illustrating the portable communication terminal of FIG. 5, in which the portable communication terminal is cradled.

Referring to FIGS. 5 through 7, the structure of the portable communication terminal according to the second embodiment of the present invention will be described. As illustrated in FIGS. 5 through 7, the portable communication terminal according to the second embodiment of the present invention has a self-cradling unit to enable the body to be inclined by itself. The portable communication terminal includes a rotatable socket 220 mounted on a bottom surface of the body 200, and a power supply unit 230 received in the bottom surface of the body 200 and integrated with the rotatable socket 220. The rotatable socket 220 rotates in a direction toward or away from the body by a first hinge unit at a first hinge axis A1 and a second hinge unit 240 arranged to be adjacent to the first hinge unit, while facing the bottom surface of the body 200. The second hinge axis A2 of the second hinge unit 240 is parallel with the first hinge axis A1, and extends to be in parallel with the first and second hinge units. In addition, the first hinge unit is disposed on an upper surface of the body 200, and the second hinge unit 240 is arranged on the bottom surface of the body 200.

The power supply unit 230 is preferably made up of a battery pack including a plurality of battery cells (not shown), and detachably attached to the rotatable socket 220 in a parallel direction. The power supply unit 230 rotates in a direction toward or away from the body 200 while facing the bottom surface of the body 200. The power supply unit 230 is integrated with and moves along with the rotatable socket 220. The power supply unit 230 rotates and allows an end thereof to contact with the ground to slantingly support the body 200. The cradled portable communication terminal is illustrated in FIG. 7. A plurality of keys (not shown) are arranged on the upper surface of the body 200 to input data, while a data output unit such as a liquid crystal display, or a data input/output unit such as a touch screen is disposed on the bottom surface of the folder 210.

As illustrated in FIG. 6, the power supply unit 230 is provided with a connection member 232 and the rotatable socket 220 has a first slot 222 formed therein, through which the connection member 232 is inserted into the rotatable socket 220 in parallel. The connection member 232 is provided with a connector, preferably plural connectors, including a plurality of exposed terminals. Further, the body 200 has an outer rim 201 formed along an edge on the bottom surface thereof, and a second slot S surrounded by the outer rim 201. The power supply unit 230 is completely received in the second slot S. More particularly, a space of the second slot S corresponds to a sum of size of the rotatable socket 220 and the power supply unit 230. Since the outer rim 201 protects the power supply unit 230, there is an advantage of minimizing impact applied to the power supply unit 230 when dropping the portable communication terminal.

The connection member 232 is electrically connected to the rotatable socket 220 and mechanically held. Thus, the connection member 232 has double functions such as electrically connecting and mechanically holding the power supply unit 230.

The structure of the second hinge unit 240 has been already described in detail with reference to FIG. 14, and thus the detailed description thereof will be omitted. However, depending on the kind of driving source, the second hinge unit includes the hinge module 542 and the hinge dummy 544 to semi-automatically supply a driving source, or include an electric motor, a reduction gear for the electric motor, an electric motor controller, and a cam (not shown) to automatically supply a driving source.

Figure 8:
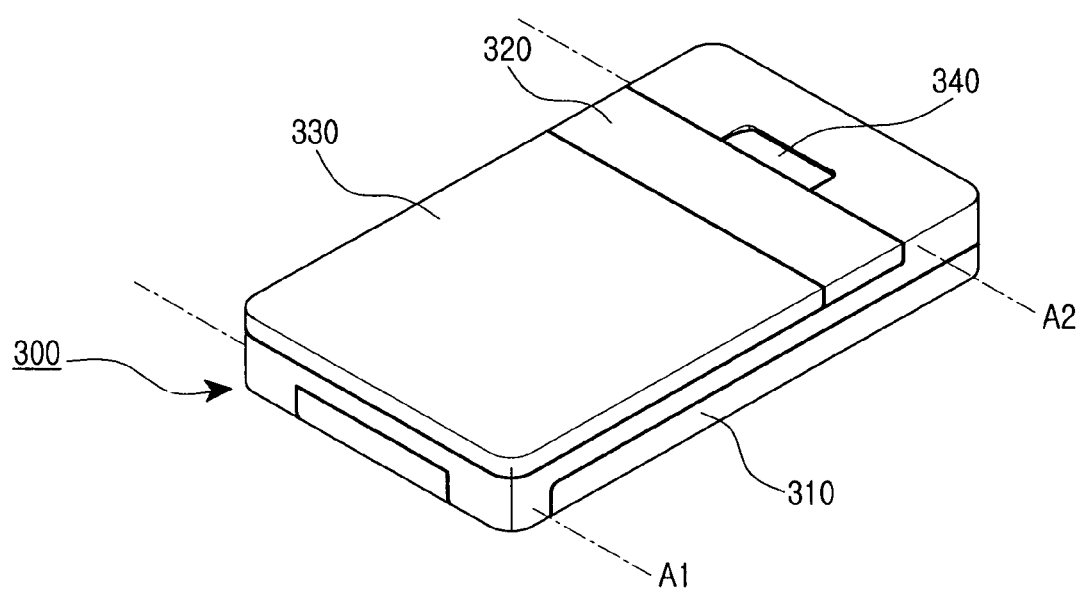
FIG. 8 is a perspective view illustrating a portable communication terminal according to a third embodiment of the present invention, in which a lower folder is shown.
Figure 9:
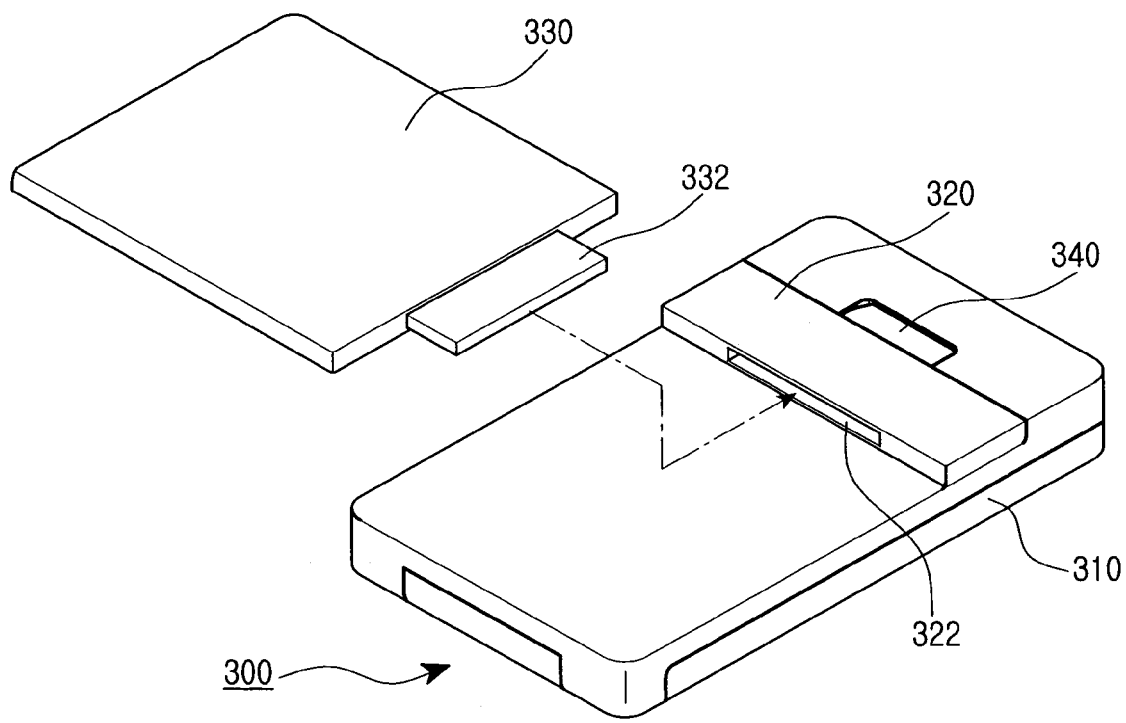
FIG. 9 is a perspective view illustrating the portable communication terminal of FIG. 8, in which a power source is disassembled.
Figure 10:
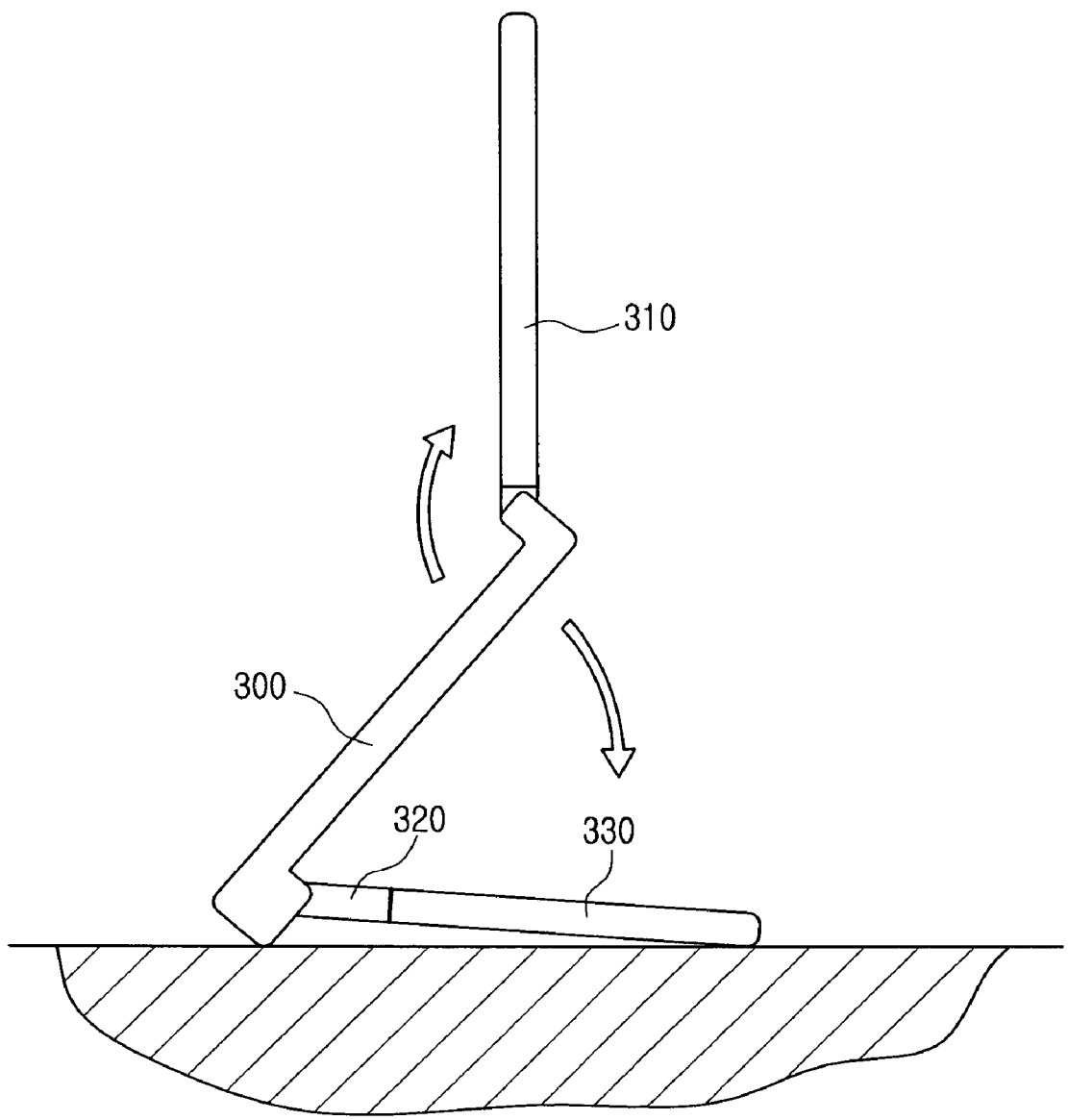
FIG. 10 is a side view illustrating the portable communication terminal of FIG. 8, in which the portable communication terminal is cradled.

As illustrated in FIGS. 8 through 10, the portable communication terminal according to the third embodiment of the present invention includes a self-cradling unit to enable a body 300 to be slantingly cradled by itself. The portable communication terminal further includes a rotatable socket 320 mounted on a bottom surface of a body 300 with which a folder 310 is assembled by a first hinge unit, and a power supply unit 330 being integrated with the rotatable socket 320. The rotatable socket 320 rotates in a direction toward or away from the body 300 by a second hinge unit 340 to be remote from the first hinge unit, while facing the bottom surface of the body 300. A second hinge axis A2 provided at the second hinge unit 340 is parallel with a first hinge axis A1. In addition, the first hinge unit is disposed on the upper surface of the body 300, and the second hinge unit 340 is arranged on the bottom surface of the body 300.

The power supply unit 330 is preferably made up of a battery pack including a plurality of battery cells (not shown), and detachably attached to the rotatable socket 320 in parallel. The power supply unit 330 rotates in a direction toward or away from the body 300 while facing the bottom surface of the body 300. The power supply unit 330 is integrated with the rotatable socket 320 and moves together. The power supply unit 330 rotates and enables a free end of the power supply unit 330 to contact the ground to slantingly support the body 300. The cradled body 300 is illustrated in FIG. 10. A plurality of keys (not shown) are arranged on the upper surface of the body 300 to input data, while a data output unit such as a liquid crystal display, or a data input/output unit such as a touch screen is disposed on the bottom surface of the folder 310.

As illustrated in FIG. 9, the power supply unit 330 includes a connection member 332, and the rotatable socket 320 has a first slot 322 through which the connection member 332 is inserted into the rotatable socket 320 in parallel. The connection member 332 is made up of a connector, preferably plural connectors, including a plurality of exposed terminal.

The connection member 332 is provided for the power supply unit 330, which is electrically connected to the rotatable socket 320 and mechanically held. Thus, the connection member 332 has double functions such as electrically connecting and mechanically holding the power supply unit 330 to the socket 320.

The structure of the second hinge unit 340 has been already described in detail with reference to FIG. 14, and thus the detailed description thereof will be omitted. The hinge module supplies stop the rotatable socket 320 so that the power supply unit 330 slantingly supports the body 300.

Figure 11:
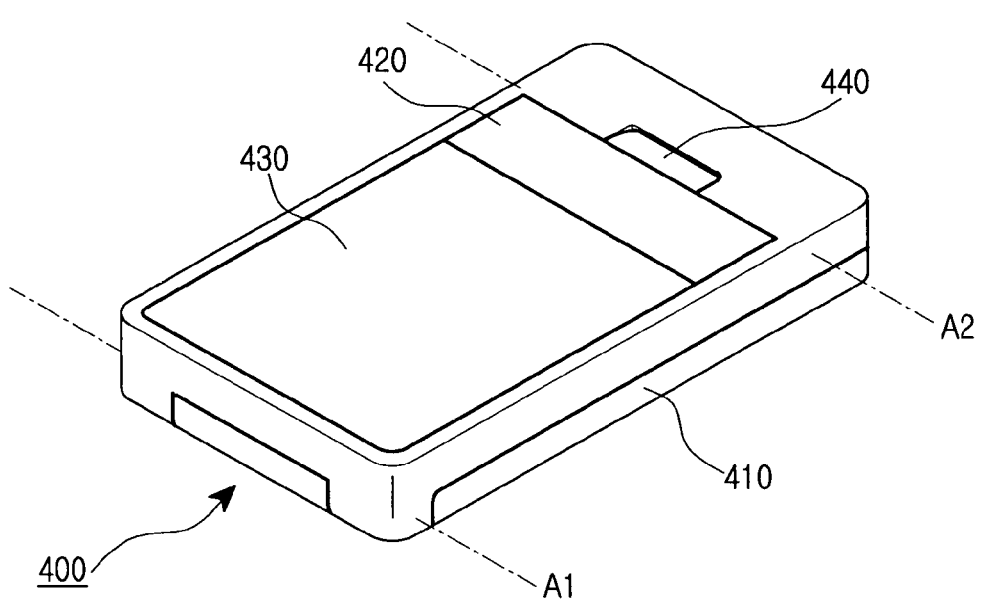
FIG. 11 is a perspective view illustrating a portable communication terminal according to a fourth embodiment of the present invention, in which a lower folder is shown.
Figure 12:
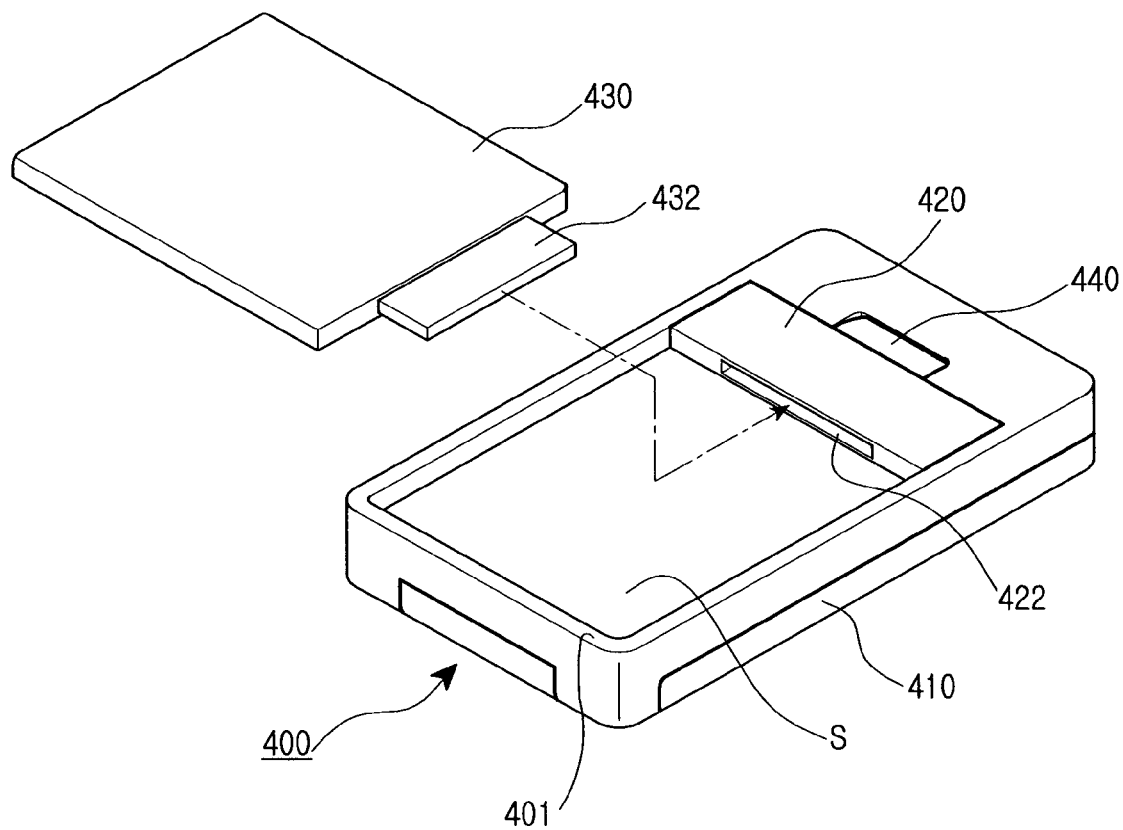
FIG. 12 is a perspective view illustrating the portable communication terminal of FIG. 11, in which a power source is disassembled.
Figure 13:
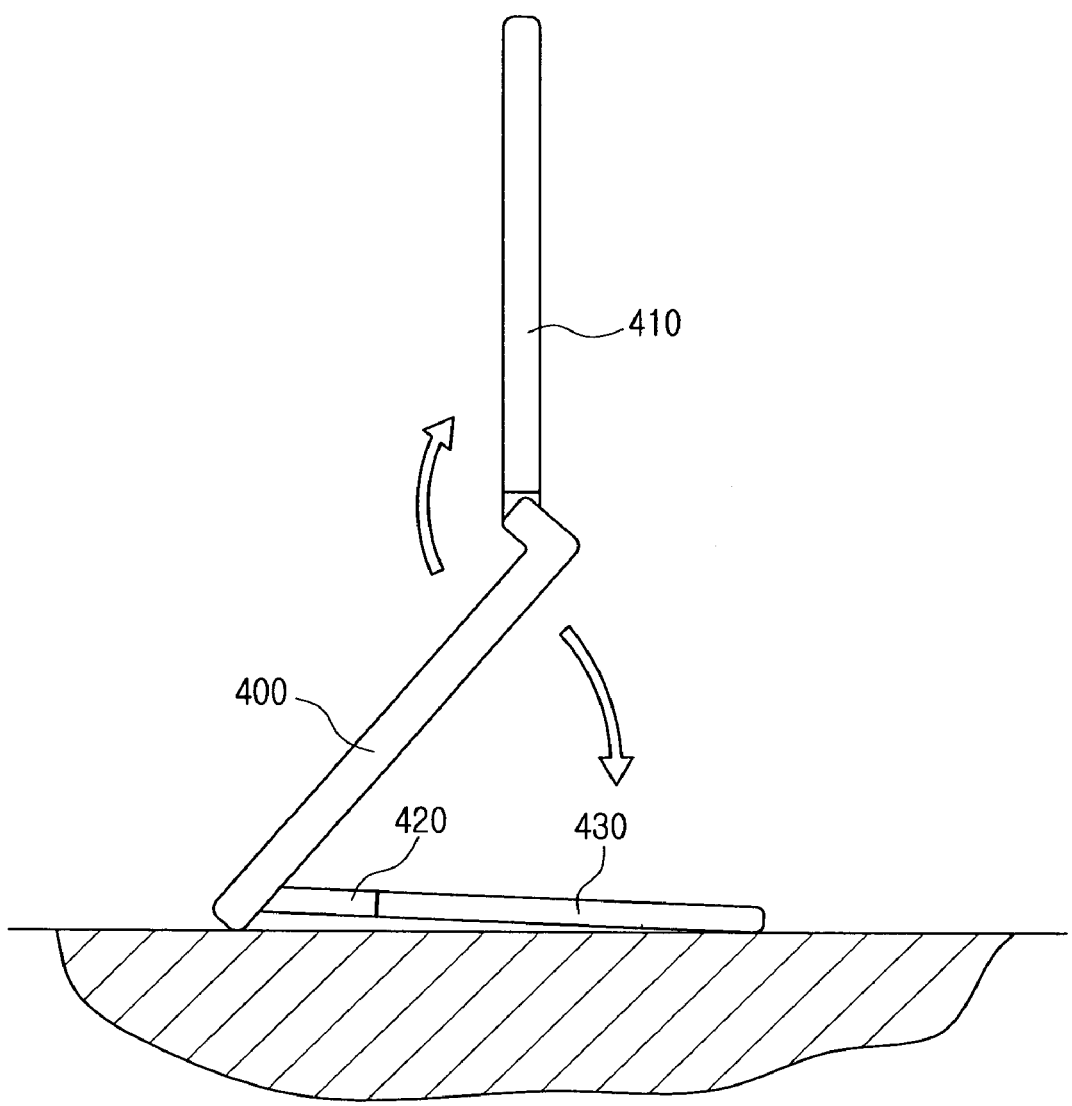
FIG. 13 is a side view illustrating the portable communication terminal of FIG. 11, in which the portable communication terminal is cradled.

The portable communication terminal according to the fourth embodiment of the present invention will be described with reference to FIGS. 11 through 13. As illustrated in FIGS. 11 through 13, the portable communication unit according to the fourth embodiment of the present invention includes a self-cradling unit to enable a body 400 to be slantingly cradled by itself. The portable communication unit further includes a rotatable socket 420 mounted on a bottom surface of the body 400, and a power supply unit 430 which is integrated with the rotatable socket 420 to be completely received in the bottom surface of the body 400, or rotates to come out from the bottom surface of the body 400. The rotatable socket 420 rotates by a second hinge unit 440 to be remote from a first hinge unit in a direction toward or away from the body 400 while facing the bottom surface of the body 400. A second hinge axis A2 provided at the second hinge unit 440 is parallel with a first hinge axis A1. In addition, the first hinge unit is disposed on an upper surface of the body 400, and the second hinge unit 440 is arranged on the bottom surface of the body 400.

The power supply unit 440 is preferably made up of a battery pack including a plurality of battery cells (not shown), and detachably attached to the rotatable socket 420 in parallel. The power supply unit 430 rotates and enables a portion of the bottom surface of the power supply unit 430 to contact the ground to slantingly support the body 400. The cradled portable communication terminal is illustrated in FIG. 13. A plurality of keys (not shown) are arranged on an upper surface of the body to input data, while a data output unit such as a liquid crystal display, or a data input/output unit such as a touch screen is disposed on the bottom surface of the folder 410.

As illustrated in FIG. 12, the power supply unit 430 includes a connection member 432, and the rotatable socket 420 has a first slot 422 through which the connection member 432 is inserted in parallel into the rotatable socket 420. The connection member 432 is made up of a connector, preferably plural connectors, including a plurality of exposed terminals. Further, the body 400 further includes an outer rim 401 formed along an edge of the bottom surface of the body 400, and a second slot S surrounded by the outer rim 401. The outer rim 401 continuously extends and completely surrounds the second slot S. More particularly, the space of the second slot S corresponds to a size of the rotatable socket 420 and the power supply unit 430. As the outer rim 401 protects the power supply unit 430, there is an advantage of minimizing impact when dropping the portable communication terminal.

The connection member 432 is provided at the power supply unit 430, which is electrically connected to the rotatable socket 420 and mechanically held. Thus, the connection member 432 has double functions such as electrically connecting and mechanically holding the power supply unit 430.

The structure of the second hinge unit 440 has been already described in detail with reference to FIG. 14, and thus the detailed description thereof will be omitted. However, according to the kind of driving source, the second hinge unit may be made up of the hinge module 542 and the hinge dummy 544 to semi-automatically operate, or include an electric motor, a reduction gear for an electric motor, and an electric motor controller, and a cam (not shown) to automatically operate.

As described above, the portable communication terminal enables the rotatable power supply unit to slantingly cradle the body by itself, thereby providing a convenience in a cradling mode and in addition economical benefit. Further, the power supply unit has a cradling function, thereby providing stability by its weight when cradling the portable communication terminal. In addition, the present invention can rapidly and easily cradle the portable communication terminal.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A self-cradling type portable communication terminal, comprising:
    a body;
    a folder;
    a first hinge unit mounted on an upper surface of the body for rotatably connecting the folder to the body, thereby providing a semi-automatic opening and closing force;
    a rotatable socket mounted on a bottom surface of the body, the rotatable socket having a second hinge axis to be parallel with a first hinge axis, and rotatably connected to the body by a second hinge unit being adjacent to the first hinge unit; and
    a power supply unit detachably attached to the rotatable socket in parallel, and rotating in a direction toward or away from the body while facing the bottom surface of the body, wherein a free end of the power supply unit contacts the ground for slantingly supporting the body.

2. The self-cradling type portable communication terminal as claimed in claim 1, wherein the power supply unit further includes a connection member, and the rotatable socket has a first slot through which the connection member is inserted into the socket in parallel.

3. The self-cradling type portable communication terminal as claimed in claim 1, wherein the rotatable socket is connected to the body for rotating in a direction toward or away from the body while facing the bottom surface of the body.

4. The self-cradling type portable communication terminal as claimed in claim 1, wherein an outer rim having a predetermined thickness is formed on the bottom surface of the body, and a second slot is surrounded by the outer rim, in which the power supply unit is completely received in the second slot.

5. The self-cradling type portable communication terminal as claimed in claim 1, wherein the second hinge unit includes a hinge module and a hinge dummy corresponding to the hinge module.

6. A portable communication terminal, comprising:
    a body;
    a folder;
    a first hinge unit mounted on an upper surface of the body for rotatably connecting the folder to the body, thereby providing a semi automatic opening and closing force;
    a rotatable socket mounted on a bottom surface of the body, the rotatable socket having a second hinge axis to be parallel with a first hinge axis, and rotatably connected to the body by a second hinge unit to be remote from the first hinge unit; and
    a power supply unit detachably attached to the rotatable socket in parallel, and rotating in a direction toward or away from the body while facing the bottom surface of the body, wherein a free end of the power supply unit contacts the ground for slantingly supporting the body.

7. The portable communication terminal as claimed in claim 6, wherein the power supply unit is provided with a connection member, and the rotatable socket has a first slot through which the connection member is inserted into the socket in parallel.

8. The portable communication terminal as claimed in claim 6, wherein the rotatable socket is connected to the body for rotating in a direction toward or away from the body while facing the bottom surface of the body.

9. The portable communication terminal as claimed in claim 6, wherein an outer rim having a predetermined thickness is formed on the bottom surface of the body, and a second slot is surrounded by the outer rim, in which the power supply unit is completely received in the second slot.

10. The portable communication terminal as claimed in claim 6, wherein the rotatable socket rotates semi-automatically or automatically.

* * * * *